(12) United States Patent
Wright et al.

(10) Patent No.: US 9,023,958 B2
(45) Date of Patent: May 5, 2015

(54) METHODS AND SYSTEMS FOR CATALYST DELIVERY

(71) Applicant: Univation Technologies, LLC, Houston, TX (US)

(72) Inventors: Dale A. Wright, Charleston, WV (US); John R. Parrish, Cross Lanes, WV (US); James L. Swecker, II, Clendenin, WV (US); Mark G. Goode, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/357,704

(22) PCT Filed: Oct. 25, 2012

(86) PCT No.: PCT/US2012/061881
§ 371 (c)(1),
(2) Date: May 15, 2014

(87) PCT Pub. No.: WO2013/081748
PCT Pub. Date: Jun. 6, 2013

(65) Prior Publication Data
US 2014/0378640 A1    Dec. 25, 2014

Related U.S. Application Data

(60) Provisional application No. 61/565,012, filed on Nov. 30, 2011.

(51) Int. Cl.
*C08F 2/00* (2006.01)
*C08F 2/34* (2006.01)
(Continued)

(52) U.S. Cl.
CPC .. *B01J 4/001* (2013.01); *B01J 8/24* (2013.01); *B01J 8/00* (2013.01); *C08F 110/02* (2013.01);
(Continued)

(58) Field of Classification Search
CPC .............. C08F 2/34; B01J 8/0015; B01J 8/24
USPC .............. 526/88, 919; 422/131, 307; 406/108
See application file for complete search history.

(56) References Cited

U.S. PATENT DOCUMENTS 2,858,902 A     11/1958   Cottle
3,790,036 A  *  2/1974    Miller .......................... 406/128
(Continued)

FOREIGN PATENT DOCUMENTS

EP            0612764        8/1994
WO     WO 2010/076289        7/2010

*Primary Examiner* — Fred M Teskin
(74) *Attorney, Agent, or Firm* — Kristina Leavitt (57) ABSTRACT

A method for the delivery of a catalyst to a polymerization reactor is disclosed, comprising: contacting a catalyst with a carrier fluid comprising an inert hydrocarbon in gaseous form, the inert hydrocarbon having a normal boiling point of about −1° C. to about 81° C.; and flowing the carrier fluid to the polymerization reactor such that the carrier fluid transports the catalyst to the polymerization reactor. A catalyst delivery system is disclosed, comprising: a catalyst vessel for containing a catalyst; a catalyst injection line for delivering the catalyst to a polymerization reactor, the catalyst injection line being in fluid communication with the catalyst vessel and the polymerization reactor; and a carrier fluid line in fluid communication with the catalyst injection line for delivering a carrier fluid comprising an inert hydrocarbon to the catalyst injection line, the inert hydrocarbon having a normal boiling point of about −1° C. to about 81° C.

15 Claims, 6 Drawing Sheets

(51) Int. Cl.
*B01J 4/00* (2006.01)
*B01J 7/00* (2006.01)
*B65G 51/02* (2006.01)
*B01J 8/24* (2006.01)
*B01J 8/00* (2006.01)
*C08F 110/02* (2006.01)

(52) U.S. Cl.
CPC .............. *B01J 7/00* (2013.01); *B01J 2204/002* (2013.01); *B01J 2204/007* (2013.01); *B01J 2219/00042* (2013.01); *B65G 51/02* (2013.01); *Y10S 526/919* (2013.01)

(56) References Cited

U.S. PATENT DOCUMENTS

| | | | |
|---|---|---|---|
| 6,391,986 B1 * | 5/2002 | Goode et al. | 526/88 |
| 6,936,226 B2 | 8/2005 | Agapiou et al. | |
| 7,343,225 B2 | 3/2008 | Hartley et al. | |
| 7,714,082 B2 | 5/2010 | Cai et al. | |
| 2005/0267268 A1 | 12/2005 | Hendrickson | |
| 2010/0324233 A1 | 12/2010 | Matthews et al. | |

* cited by examiner

METHODS AND SYSTEMS FOR CATALYST DELIVERY

CROSS-REFERENCE TO RELATED APPLICATIONS

This application is a National Stage application under 35 U.S.C. §371 of International Application No. PCT/US2012/061881, filed Oct. 25, 2012, that claims the benefit of Ser. No. 61/565,012, filed Nov. 30, 2011, the disclosures of which are incorporated by reference in their entireties.

BACKGROUND

Advances in polymerization and catalysts have produced new polymers having improved physical and mechanical properties useful in a wide variety of products and applications. With the development of new catalysts, the choice of polymerization, such as solution, slurry, high pressure or gas phase, for producing a particular polymer has been greatly expanded. Advances in polymerization technology have also provided more efficient, highly productive and economically enhanced processes.

With these advances, a number of different techniques have been developed for delivering catalysts to polymerization reactors. One technique involves delivery of the catalyst to the reactor in a slurry with the catalyst suspended in a hydrocarbon liquid. Another technique involves use of an olefin monomer (e.g., ethylene) as a carrier gas for catalyst delivery. While olefin monomers have been used successfully for catalyst delivery, their use is challenging for catalysts, such as chromium-based catalysts, in which the catalysts are reduced and activated by the monomer without a co-catalyst. As such, the carrier gas for delivering such catalysts typically cannot be an olefin monomer, as this would likely cause polymerization and plugging in the catalyst delivery system. Because it is non-reactive with the catalysts, nitrogen has been used as an alternative carrier gas for catalyst delivery. However, to prevent nitrogen accumulation in the reactor, a reactor vent may be required. This is especially problematic in reactors without a vent recovery system, leading to undesirable loss of monomer. In general, a vent recovery system is any system used to recover selected components from the reactor vent. Even further, loss of monomer through the reactor vent may be exacerbated in reactors operating at high ethylene partial pressures.

Accordingly, there exists a need for improved methods of catalyst delivery, for example, to reduce the amount of nitrogen feed to the polymerization reactors and, thus, reduce the reactor vent to remove nitrogen.

SUMMARY

Disclosed herein are processes for the delivery of a catalyst to a polymerization reactor. For example, the processes may comprise contacting a catalyst with a carrier fluid that may comprise an inert hydrocarbon in gaseous form, the inert hydrocarbon having a normal boiling point of about $-1°$ C. to about 81° C. The processes may further comprise flowing the carrier fluid to the polymerization reactor such that the carrier fluid transports the catalyst to the polymerization reactor.

Disclosed herein are catalyst delivery systems. For example, the systems may comprise a catalyst vessel for containing a catalyst. The systems may further comprise a catalyst injection line for delivering the catalyst to a polymerization reactor, the catalyst injection line being in fluid communication with the catalyst vessel and the polymerization reactor. The systems may further comprise a carrier fluid line in fluid communication with the catalyst injection line for delivering a carrier fluid comprising an inert hydrocarbon in gaseous form to the catalyst injection line, the inert hydrocarbon having a normal boiling point of about $-1°$ C. to about 81° C.

BRIEF DESCRIPTION OF THE DRAWINGS

These drawings illustrate certain aspects of the present invention and should not be used to limit or define the invention.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. In the following detailed description, specific aspects and features of the present invention are described in connection with several embodiments. However, to the extent that the following description is specific to a particular embodiment or a particular use of the present techniques, it is intended to be illustrative only and merely provides a concise description of exemplary embodiments. Moreover, in the event that a particular aspect or feature is described in connection with a particular embodiment, such aspects and features may be found and/or implemented with other embodiments of the present invention where appropriate. Accordingly, the invention is not limited to the specific embodiments described below, but rather, the invention includes all alternatives, modifications, and equivalents falling within the scope of the appended claims.

Described herein are methods that use a carrier fluid that may comprise an inert hydrocarbon in gaseous form for the delivery of catalyst to a polymerization reactor. Preferably, the inert hydrocarbon has a normal boiling point of about $-1°$ C. to about 81° C. Also described herein are methods that may replace nitrogen gas used in the carrier fluid with the inert hydrocarbon.

As described herein, a carrier fluid comprising the inert hydrocarbon may be used for the delivery of the catalyst to the reactor. In some embodiments, a carrier fluid comprising the inert hydrocarbon and nitrogen may be used for the delivery of the catalyst to the reactor. By use of the gaseous inert hydrocarbon in the carrier fluid, the amount of nitrogen fed to the reactor can be reduced. Without being limited by theory, it is believed that the reactor vent requirement and, thus, the amount of monomer lost through the vent can be reduced by this reduction in the nitrogen feed. Additionally, it is further believed that the ethylene partial pressure in the reactor can be maintained, or potentially even increased by use of the catalyst delivery systems described herein which are characterized by a reduced vent requirement.

Figure 1:
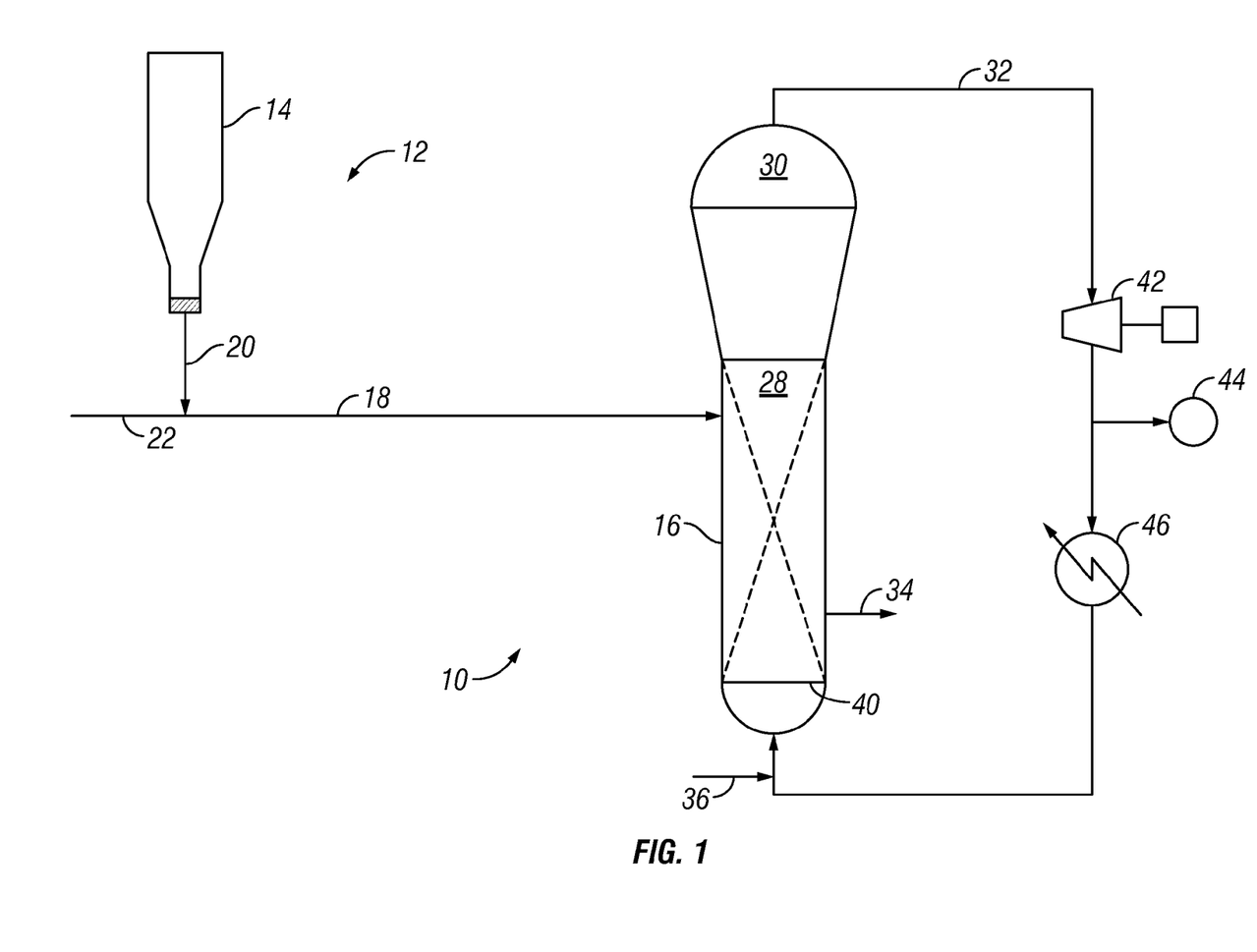
FIG. 1 is a schematic diagram illustrating an exemplary polymerization system with a catalyst delivery system.

Referring now to FIG. 1, a polymerization system 10 with a catalyst delivery system 12 is illustrated. In FIG. 1, the catalyst delivery system 12 includes a catalyst vessel 14 for containing a catalyst. The catalyst vessel 14 may be any of a variety of different vessels suitable for feeding catalyst to reactor 16. The catalyst generally should be stored in the catalyst vessel 14 at a pressure higher than the reactor 16 to facilitate transport of the catalyst to the reactor 16. In some embodiments, a nitrogen blanket may be maintained in the catalyst vessel 14. In some embodiments, the catalyst vessel 14 is a dry catalyst feeder vessel. An example of a suitable catalyst vessel 14 is described in U.S. Pat. No. 3,779,712. Any type of polymerization catalyst may be used, including liquid-form catalysts, solid catalysts, and heterogeneous or supported catalysts, among others, and may be fed to the reactor 16 as a slurry (liquid/solid mixture), or as a solid. The catalyst delivery systems described herein are particularly suited for delivering solid catalyst to the reactor 16. Examples of suitable catalysts for use in embodiments of the present invention will be described in more detail below.

The catalyst vessel 14 may be coupled to a catalyst injection line 18, where catalyst injection line 18 is in fluid communication with the catalyst vessel 14 and the reactor 16. The catalyst may be transported from the catalyst vessel 14 through the catalyst injection line 18 and into the reactor 16. In some embodiments, the catalyst is released from the catalyst vessel 14 and passes through line 20 into the catalyst injection line 18. Carrier fluid line 22 may be coupled to the catalyst injection line 18, such that the carrier fluid line 22 is in fluid communication with the catalyst injection line 18. The carrier fluid line 22 may be used to flow the carrier fluid, such as the inert hydrocarbon, to the reactor 16 via the catalyst injection line 18 such that the carrier fluid transports the catalyst to the reactor 16. To prevent carrier fluid back up into the catalyst vessel 14, the catalyst vessel 14 may be maintained at a higher pressure than the catalyst injection line 18 and the carrier fluid line 22. This pressurization of the catalyst vessel 14 can be achieved, for example, with a separate nitrogen source (not shown). While not illustrated, a check valve may also be employed in line 20 to prevent carrier fluid back up into the catalyst vessel 14. In the event of a blockage of the catalyst injection line 18, the feed of the carrier fluid can be discontinued by closing a valve (not shown) to prevent the carrier fluid from entering catalyst vessel 14 through back flow in line 20.

As previously mentioned, the carrier fluid may comprise an inert hydrocarbon in gaseous form, the inert hydrocarbon having a normal boiling point of about −1° C. to about 81° C. As used herein, the term "inert hydrocarbon" refers to any hydrocarbon that is non-reactive in the process, is not a significant polymerization catalyst poison, and is soluble in the resin produced such that partial and/or total removal via solids discharge from the reactor can be achieved. As will be appreciated by those of ordinary skill in the art, a hydrocarbon is a significant polymerization catalyst poison if it reduces catalyst efficiency by an amount that would render the process technically unfeasible or economically unjustifiable. Examples of suitable inert hydrocarbons having a normal boiling point of about −1° C. to about 81° C. include n-butane, cyclobutane, C5 saturated hydrocarbons, and C6 saturated hydrocarbons. Examples of specific C5 and C6 saturated hydrocarbons include, without limitation, neopentane, cyclobutane, isopentane, n-pentane, cyclopentane, 2,2-dimethylbutane(neohexane), 2,3-dimethylbutane, 2-methylpentane(isohexane), 3-methylpentane, n-hexane, 2,2-dimethylepentane(neoheptane), 2,4-dimethylpentane, and cyclohexane. In some implementations where isopentane is readily available, such as when is used as a separate input to the reactor 16 or in other processes adjacent to the reactor 16, isopentane may be a preferred inert hydrocarbon. Similarly, other inert hydrocarbons may be preferred depending on their availability and use in other reactions or processes near the polymerization reactor 16. Mixtures of suitable inert hydrocarbons may also be employed in some examples.

Figure 2:
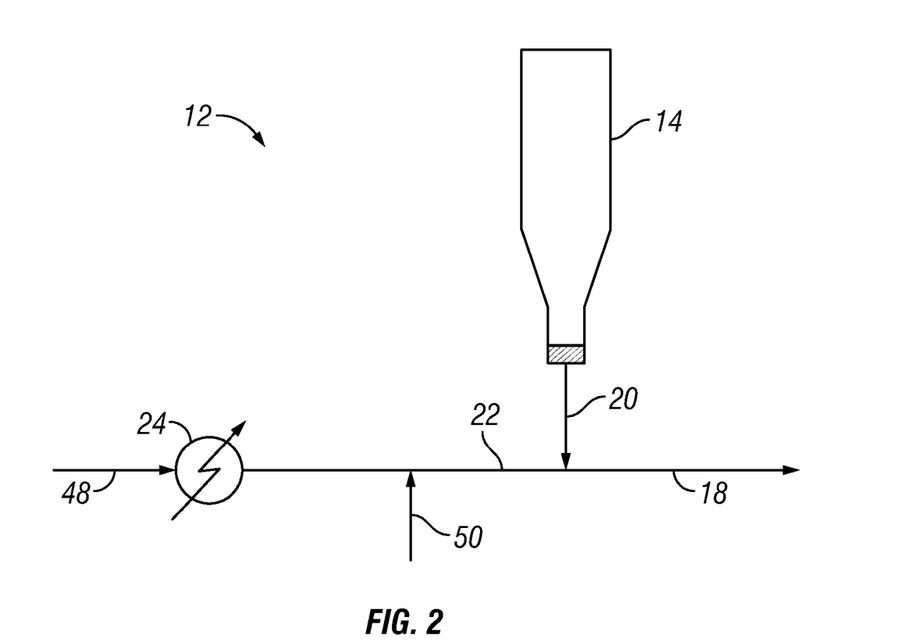
FIG. 2 is a schematic diagram illustrating an exemplary catalyst delivery system.

The inert hydrocarbon may be present in the carrier fluid in a liquid form, a gaseous form, or a combination thereof. In some embodiments, the inert hydrocarbon may be present in the carrier fluid in gaseous form. For example, a carrier fluid comprising the inert hydrocarbon in gaseous form may be used to transport the catalyst to the reactor 16 via the catalyst injection line 18. Those of ordinary skill in the art, will appreciate that high temperatures may be needed for the inert hydrocarbon to be in gaseous form at reactor pressures. As illustrated by FIG. 2, a heat exchanger 24 may be used to vaporize the inert hydrocarbon in certain embodiments. A catalyst delivery system 12 comprising the heat exchanger 24 will be discussed in more detail below with respect to FIG. 2. In some embodiments, the inert hydrocarbon may condense as the carrier fluid travels in the catalyst injection line 18 towards the reactor 16 such that the carrier fluid comprises the inert hydrocarbon in both gaseous and liquid forms. As will be discussed in more detail below with respect to FIG. 3, additional embodiments may include a valve 26 (shown on FIG. 3) for flashing the liquid inert hydrocarbon into the carrier fluid line 22.

Referring now to FIG. 2, a catalyst delivery system 12 is illustrated which includes a heat exchanger 24 for heating the inert hydrocarbon in hydrocarbon feed line 48. The heat exchanger 24 may be any suitable device for heating the inert hydrocarbon, including, but not limited to, a kettle boiler or a shell and tube heat exchanger. In the illustrated embodiment, the inert hydrocarbon in hydrocarbon feed line 48 passes through the heat exchanger 24 before flowing into carrier fluid line 22. As illustrated, nitrogen may flow into the carrier fluid line 22 via nitrogen line 50 such that the carrier fluid in line 22 comprises inert hydrocarbon and nitrogen. In some embodiments, the heat exchanger 24 vaporizes liquid inert hydrocarbon in the hydrocarbon feed line 48. For example, the heat exchanger 24 may vaporize at least about 10% of the inert hydrocarbon, or at least about 25% of the inert hydrocarbon, or at least about 50% of the inert hydrocarbon, or at least about 75% of the inert hydrocarbon, or at least about 90% of the inert hydrocarbon, or at least about 95% of the inert hydrocarbon. In one example, essentially all the inert hydrocarbon is vaporized by the heat exchanger 24.

Figure 3:
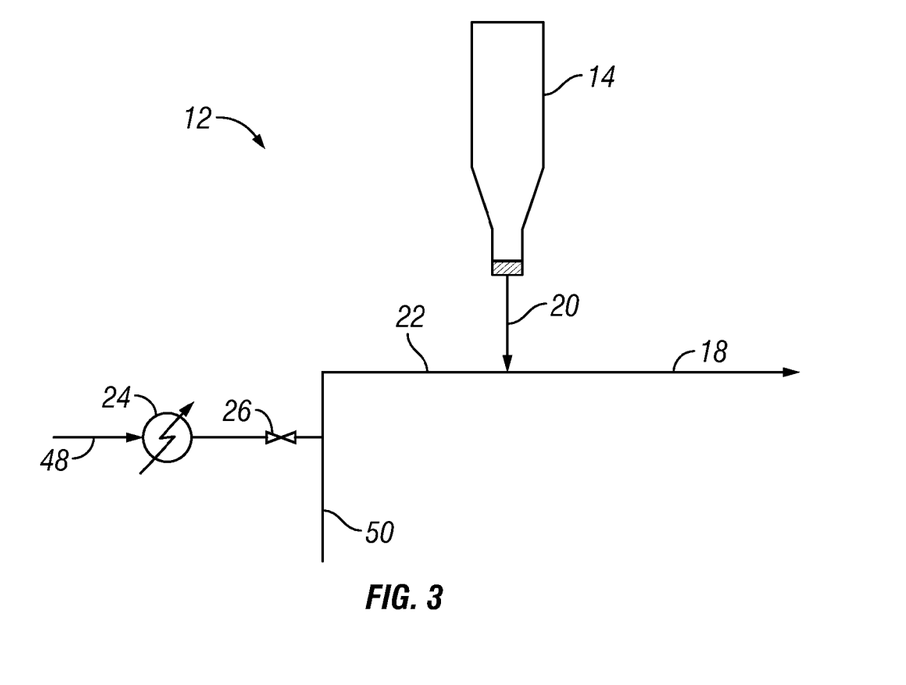
FIG. 3 is a schematic diagram illustrating an exemplary catalyst delivery system.

Referring now to FIG. 3, a catalyst delivery system 12 is illustrated which includes a heat exchanger 24 for heating the inert hydrocarbon in the hydrocarbon feed line 48. Thus, hydrocarbon feed line 48 comprises liquid inert hydrocarbon that is heated in the heat exchanger 24. In some embodiments, the liquid inert hydrocarbon is superheated by the heat exchanger 24. Valve 26 may be coupled to the hydrocarbon feed line 48 after the heat exchanger 24 such that the inert hydrocarbon flows out of the heat exchanger 24 and to valve 26. In some embodiments, the liquid inert hydrocarbon in hydrocarbon feed line 48 flashes across the valve 26 and into nitrogen line 50 such that the carrier fluid in line 22 comprises the inert hydrocarbon in gaseous form and nitrogen.

In some embodiments of the disclosed catalyst delivery system, the carrier fluid further may comprise nitrogen in addition to the inert hydrocarbon. As illustrated by FIGS. 2 and 3, nitrogen may flow into the carrier fluid line 22 via nitrogen line 50. Inclusion of nitrogen in the carrier fluid may be desired, for example, to decrease the temperature required to volatilize the inert hydrocarbon and to provide a purge on the catalyst vessel 14 to prevent the inert hydrocarbon from entering the catalyst vessel 14. The catalyst vessel 14 may be heated and/or insulated, and may be maintained at a temperature above which the inert hydrocarbon carrier fluid or inert hydrocarbon and nitrogen mixed carrier fluid can condense. The nitrogen may also be employed to purge the line or inert hydrocarbon in preparation for maintenance.

In some embodiments, nitrogen alone can be employed temporarily as the conveying medium for the catalyst when the carrier fluid is transitioned from nitrogen to the inert hydrocarbon. In some embodiments, the nitrogen can be employed with the inert hydrocarbon to reduce and manipulate the amount of inert hydrocarbon in the conveying medium in order to control the concentration of the inert hydrocarbon in the reactor 16. The nitrogen may be present in the carrier fluid in an amount, for example, in the range of from about 0.1% to about 90% by weight of the carrier fluid, or from about 10% to about 75% by weight of the carrier fluid, or from about 20% to about 50% by weight of the carrier fluid.

As previously mentioned, the catalyst vessel 14 in FIGS. 1-3 may be pressurized with a separate nitrogen source (not shown) to a pressure greater than that in line 20 and the catalyst injection line 18 to prevent the carrier fluid from entering the catalyst vessel 14. Alternatively, an auxiliary branch line (not shown) can connect the nitrogen line 50 shown on FIGS. 2 and 3, to the catalyst vessel 14 to equalize their pressure minus the small pressure decrease due to flow of carrier fluid after the branch line in nitrogen line 50 and carrier fluid line 22. A check valve (not shown) can be used in nitrogen line 50 after the auxiliary branch line to prevent the back flow of the carrier fluid into the auxiliary branch line leading to the catalyst vessel 14.

It may be desired, in some embodiments, to reduce or potentially even eliminate condensation of the inert hydrocarbon gas in the catalyst injection line 18. For example, the catalyst injection line 18 may be insulated so that the loss of heat from the line 18 can be reduced. In some embodiments, trace heating may be used on the catalyst injection line 18 so that the temperature of the catalyst injection line 18 can be raised above ambient. Non-limiting examples of trace heating that may be used include electric trace heating and steam trace heating.

Figure 4:
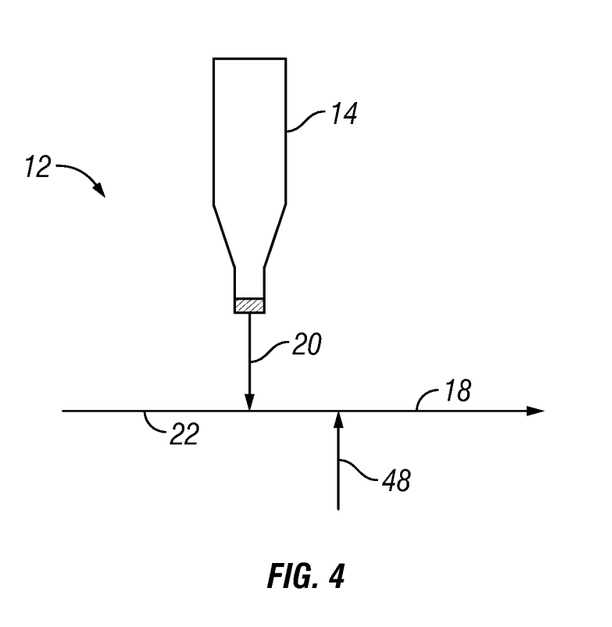
FIG. 4 is a schematic diagram illustrating an exemplary catalyst delivery system.

Referring now to FIG. 4, a catalyst delivery system 12 is illustrated where the catalyst is released from the catalyst vessel 14 and passes through line 20 into the catalyst injection line 18 such that the carrier fluid contacts the catalyst. Carrier fluid line 22 may be used to convey nitrogen, and may be coupled to the catalyst injection line 18, such that the carrier fluid line 22 is in fluid communication with the catalyst injection line 18. Accordingly, the nitrogen in the carrier fluid line 22 initially carries the catalyst. The hydrocarbon feed line 48 comprising the inert hydrocarbon is fed into the carrier fluid line 22 that comprises the nitrogen which transports the catalyst. In this configuration, catalyst vessel 14 can be isolated from the inert hydrocarbon, thus preventing back-up of the inert hydrocarbon into the catalyst vessel 14.

Referring again to FIG. 1, the catalyst delivery systems of FIG. 2, 3, or 4 may be used with the reactor 16 of FIG. 1 in place of the catalyst delivery system 12 shown in FIG. 1. While the following discussion of reactor 16 is directed to a fluidized bed reactor for gas phase polymerization, it should be understood that the present invention is not limited to any particular type of reactor.

In FIG. 1, reactor 16 includes a reaction zone 28 and a velocity reduction zone 30. The reaction zone 28 includes a fluidized bed comprising growing polymer particles, formed polymer particles, and small amounts of catalyst, fluidized by the continuous flow from recycle stream 32. The polymer product may be removed from the reaction zone 28 via product line 34. As illustrated, feed to the reactor 16 via recycle stream 32 may contain both make-up fluid (e.g. fresh monomer and/or comonomer) from make-up stream 36 and recycled fluid from the reactor 16. Recycle stream 32 may enter the reactor 16 through a distributor plate 40 at the bottom of the reaction zone 28. The distributor plate 40 may aid in uniform distribution of the recycle stream 32 and also support the solid particles of the fluidized bed. Fluidization of the fluidized bed in the reaction zone 28 results, for example, from the high rate at which the recycle stream 32 flows into and through the reactor 16. The high rate of the recycle feed stream 32 allows for the superficial gas velocity to suspend and mix the fluidized bed in the reaction zone 28 in a fluidized state.

In FIG. 1, the recycle stream 32 passes upward through the reaction zone 28, absorbing heat generated by the polymerization process. The portion of the recycle stream 32 that does not react in the reaction zone 28 should leave the reaction zone 28 and pass through the velocity reduction zone 30. In the velocity reduction zone 30, most polymer particles entrained within the recycle stream 32 should drop back down into the reaction zone 28, thereby reducing the amount of polymer particles that may exit the reactor 16 in recycle stream 32. In some embodiments, after exiting the reactor 16, the recycle stream 32 may be compressed by compressor 42. As illustrated, a gas analyzer 44 may be used to analyze samples from the recycle stream 32 prior to its return to the reactor 16. In some embodiments, after compression, the recycle stream 32 may flow through heat exchanger 46, to remove the heat generated by the polymerization process and cool the recycle stream 32.

The catalyst delivery systems described herein may be used with a gas phase or slurry phase polymerization of one or more olefins, such as ethylene or propylene. The polymerization process may be conducted over a wide range of temperatures and pressures. The temperatures, for example, may be in the range of from about 50° C. to about 280° C. In some embodiments, the temperature may be range from about 60° C. to about 280° C., or from about 50° C. to about 200° C., from about 60° C. to about 120° C., or from about 70° C. to about 100° C., or from about 80° C. to about 95° C., wherein a desirable temperature range may include any combination of any upper limit with any lower limit described herein. In some embodiments, the reactor temperature in may vary, for example, from about 30° C. to about 120° C., or from about 60° C. to about 115° C., or from about 70° C. to about 110° C., or from about 70° C. to about 95° C.

The gas phase polymerization process may use one or more olefin monomers having from 2 to 30 carbon atoms, or from 2 to 12 carbon atoms, or from 2 to 8 carbon atoms. For example, two or more olefins or comonomers such as ethylene, propylene, 1-butene, 1-pentene, 4-methyl-1-pentene, 1-hexene, 1-octene, or 1-decene, may be used. For example, a copolymer of ethylene may be produced, with ethylene and a comonomer having at least one alpha-olefin having from 4 to 15 carbon atoms, or from 4 to 12 carbon atoms, or from 4 to 8 carbon atoms.

In some embodiments, ethylene or propylene may be polymerized with at least two different comonomers, optionally one of which may be a diene, to form a terpolymer.

In some embodiments, the gas phase polymerization reaction can be carried out in a single reactor or multiple reactors, such as two or more reactors in series.

Typically in a gas phase polymerization process a continuous cycle is employed where in one part of the cycle of a reactor system, a cycling gas stream, otherwise known as a recycle stream or fluidizing medium is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Examples of gas phase polymerization are described in U.S. Pat. Nos. 4,543,399, 4,588,790, 5,028,670, 5,317,036, 5,352,749, 5,405,922, 5,436,304, 5,453,471, 5,462,999, 5,616,661, 5,627,242, 5,665,818, 5,668,228, and 5,677,375, and in European publications EP-A-0 794 200, EP-A-0 802 202, EP-A2 0 891 990 and EP-B-634 421.

The reactor pressure in a gas phase process may vary, for example, from about atmospheric pressure to about 600 psig. In some embodiments, the reactor pressure may vary from about 100 psig (690 kPa) to about 500 psig (3448 kPa), or from about 200 psig (1379 kPa) to about 400 psig (2759 kPa), or from about 250 psig (1724 kPa) to about 350 psig (2414 kPa).

In some embodiments, a slurry polymerization process may be used. Slurry polymerization processes generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. In an embodiment, a hexane or an isobutane medium is employed. Particle form slurry polymerization processes, where the temperature is kept below the temperature at which the polymer goes into solution, are described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Examples of slurry processes are described in U.S. Pat. No. 4,613,484 and examples of solution processes are described in U.S. Pat. Nos. 4,271,060, 5,001,205, 5,236,998 and 5,589,555.

In some embodiments, a "condensing mode," including the "induced condensing mode" and "liquid monomer" operation of a gas phase polymerization may be used. Embodiments of the polymerization processes disclosed herein may be operated in a condensing mode, similar to those disclosed in U.S. Pat. Nos. 4,543,399, 4,588,790, 4,994,534, 5,352,749, 5,462,999, and 6,489,408, and U.S. Patent Appl. Pub. No. 2005/0137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

The condensing mode of operation in polymerization reactors may significantly increase the production rate or space time yield by providing extra heat-removal capacity through the evaporation of condensates in the cycle gas. Additional condensation is often promoted to extend the utility of condensed mode operation by adding an induced condensing agent ("ICA") into the reactor.

The amount of condensation of liquid in the circulating components can be maintained at up to about 90 percent by weight, for example. In some embodiments, the amount of condensation is in the following ranges: from about 1 percent by weight to 60 percent by weight; or from about 2 percent by weight to about 40 percent by weight; or from about 4 percent by weight to about 30 percent by weight. This degree of condensation is achieved by maintaining the outlet temperature from the heat exchanger so as to achieve the required degree of cooling below the dew point of the mixture.

In general, it would be desirable to have a high proportion of the induced condensing agent in the gaseous stream, to enhance the heat-removal from the reactor. Within the polymer particles, there is dissolved ICA, comonomer(s), other hydrocarbon(s), and even monomer(s), with quantities depending on the types of those species and the gas composition. Usually the amount of ICA in the circulating stream is one of the most important factors that affect the overall quantity of the dissolved species in the polymer. At certain levels of ICA, an excess amount of the ICA is dissolved into the polymer particles, making the polymer sticky. Therefore, the amount of the ICA that can be introduced into the reactor may be kept below the "stickiness limit" beyond which the circulating material becomes too sticky to discharge or to maintain the desired fluidization state. Each ICA has a different solubility in each specific polymer product, and in general, it is desirable to utilize an ICA having relatively low solubility in the produced polymer, so that more of the ICA can be utilized in the gaseous stream before reaching the stickiness limit. For certain polymer products and certain ICAs, such a "stickiness limit" may not exist at all.

Suitable ICAs are materials having a low normal boiling point and/or a low solubility in polymers. For example, suitable ICAs may have a normal boiling point less than 25° C.; or less than 20° C.; or less than 15° C.; or less than 10° C.; or less than 0° C.

Suitable ICAs include those having a "typical solubility" less than 1.5 kg ICA per 100 kg of polyethylene in a reactor. In some embodiments, suitable ICAs include those having a typical solubility less than 1.25 kg ICA per 100 kg of polyethylene; or less than 1.0 kg ICA per 100 kg of polyethylene; or less than 0.8 kg ICA per 100 kg of polyethylene; or less than 0.5 kg ICA per 100 kg of polyethylene; or less than 0.3 kg ICA per 100 kg of polyethylene. "Typical solubility" is determined under 90° C. reactor temperature and ICA partial pressure of 25 psi ($1.72 \times 10^5$ Pa), for polyethylene with a melt index ($I_2$)=1.0 dg/min and resin density=918 kg/m$^3$. The melt index may be determined using ASTM D1238-E (at 190° C., 2.16 kg weight).

Suitable ICAs include cyclobutane, neopentane, n-butane, isobutane, cyclopropane, propane, and mixtures thereof. It is recognized that relatively volatile solvents such as propane, butane, isobutane or even isopentane can be matched against a heavier solvent or condensing agent such as isopentane, hexane, hexene, or heptane so that the volatility of the solvent is not so appreciably diminished in the circulation loops. Conversely, heavier solvents may also be used either to increase resin agglomeration or to control resin particle size.

As will be appreciated by those of ordinary skill in the art, some alkanes are more effective ICAs than others to the extent that they provide, for example, a greater degree of cooling upon their evaporation. In the gas state, for example, a mole of propane, butane, pentane, or hexane all take up the same volume and occupy the same volume in the reactor. Some, such as the higher chain alkanes, provide a greater degree of cooling, heat adsorption, and production rate capacity in condensing mode operation without the need for high concentrations in the recirculating gas. In addition, their dew point temperature is also higher, making it easier to condense in the recycle cooling system.

In addition the previously described polymerization techniques, "enhanced dry mode operation" of a gas phase polymerization may also be used. The enhanced dry mode of operation in polymerization reactors may increase the production rate or space time by providing extra heat-removal capacity through the addition of an alkane having from 3 to 7 carbon atoms to the cycle gas. In some embodiments, suitable alkanes include cyclobutane, neopentane, n-butane, isobutane, cyclopropane, propane, and mixtures thereof. While these alkanes may be similar to those employed in an induced condensing mode, their concentration is kept below that required alone, or in combination, for condensing the gas in the recycle cooling system.

Any type of polymerization catalyst may be used, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium-based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium-based catalysts, such as those described in U.S. Pat. Nos. 3,709,853; 3,709,954; and 4,077,904.

C. Vanadium-based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Any combination of one or more of the catalysts of the above.

In one or more embodiments, a "mixed" catalyst system or "multi-catalyst" system may be used. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having the same or different metal group but having at least one different catalyst component, for example, a different ligand or general catalyst structure. Examples of useful bimetallic catalysts can be found in U.S. Pat. Nos. 6,271,325, 6,300,438, and 6,417,304. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

The described catalyst compounds, activators and/or catalyst systems, as noted above, may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 m$^2$/g. Silica has a primary particle size of about 5 to about 50 nanometers, an average size of aggregate of about 0.1 to about 30 microns, and a specific surface area from about 50 to about 500 m$^2$/g. Clay, talc, and polymeric materials have an average particle size of about 0.01 to about 10 microns and a specific surface area of about 3 to 30 m$^2$/g. These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3-CCl_3$, $CF_2Cl-CCl_3$, and ethyltrichloroacetate. Such promoters are described in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the catalyst, or as part of the catalyst In embodiments, the reactors disclosed herein are capable of producing greater than 500 lbs of polymer per hour (227 kg/hr) to about 300,000 lbs/hr (136,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 150,000 lbs/hr (68,100 kg/hr).

The polymers produced by embodiments of the process of the invention can be used in a wide variety of products and end-use applications. The polymers produced by the process of the invention may include, but are not limited to, linear low density polyethylene, low density polyethylenes, and high density polyethylenes.

The polymers, including ethylene and propylene based polymers, have a density, for example, in the range of from about 0.86 g/cm³ to about 0.97 g/cm³. In other embodiments, the polymers have a density in the range of from about 0.88 g/cm³ to about 0.965 g/cm³ or in the range of from about 0.900 g/cm³ to about 0.96 g/cm³.

The polymers produced by the process of the invention may have a molecular weight distribution, a weight average molecular weight to number average molecular weight (Mw/Mn), for example, of greater than 1.5 to about 15. In other embodiments, the polymers may have an Mw/Mn of greater than 2 to about 10 or greater than about 2.2 to less than about 8.

The polymers of the present invention may have a melt index (MI) or (I2) as measured by ASTM-D-1238-E (190° C./2.16 kg), for example, in the range from 0.01 dg/min to 1000 dg/min. In other embodiments, the polymers may have a melt index of from about 0.01 dg/min to about 100 dg/min or from about 0.1 dg/min to about 100 dg/min.

The polymers of the invention in an embodiment may have a melt index ratio (I21/I2) (I21 is measured by ASTM-D-1238-F, [190° C./21.6 kg]), for example, of from 5 to 300. In other embodiments, the polymers may have a melt index ration of from about 10 to less than 250, from 15 to 200, or from 20 to 180.

The polymers of the invention may be blended and/or coextruded with any other polymer. Non-limiting examples of other polymers include linear low density polyethylenes produced via conventional and/or single-site catalysis, elastomers, plastomers, high pressure low density polyethylene, high density polyethylenes, polypropylenes and the like.

Polymers produced by the process of the invention and blends thereof are useful in such forming operations as film, pipe, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners. Molded articles include single and multi-layered constructions in the form of bottles, tanks, large hollow articles, rigid food containers and toys, etc.

The catalyst delivery systems disclosed herein are particularly useful for chromium based catalyst systems. Chromium catalysts can be reduced and activated by the olefin monomer (e.g., ethylene) in the reactor. As such, olefin monomers cannot be used to in the catalyst feed stream to convey chromium catalyst into the reactor, without risking polymerization within the catalyst delivery system and the resulting pluggage of the catalyst delivery system.

Additionally, as many chromium catalysts are used to mainly produce high density polyethylene resins and chromium catalyzed HDPE resins typically require relatively low comonomer concentrations, reactor systems designed for chromium catalyst operation may not have a vent recovery system. Thus, when nitrogen alone is used to carry the catalyst to the reactor, the high ethylene partial pressures often result in high amounts of monomer being lost. Often between 2 to 2.5% of the monomer feed is eventually vented to prevent excess nitrogen accumulation in the polymerization reactor. Thus, using the catalyst delivery systems described herein that use a carrier fluid comprising an inert hydrocarbon in gaseous form for delivering the catalyst to the reactor, the loss of monomer from reactor vent requirements may be reduced as compared to the same process that did not use the inert hydrocarbon in the carrier fluid. For example, the loss of monomer may be reduced by at least about 0.01% by weight, or by at least about 0.1% by weight, or by at least about 0.5% by weight, or by at least about 1.0% by weight.

Furthermore, as mentioned above, the ethylene partial pressure for the polymerization process may be maintained or even increased as compared to the same process that did not use an inert hydrocarbon in gaseous form in the carrier fluid. For example, the ethylene partial pressure for the polymerization process may be increased by at least about 2%. In other embodiments, the ethylene partial pressures may be increased by at least about 5%, or at least about 10%, or at least about 15%, or at least about 20%. The corresponding increases in ethylene partial pressure for a reactor operating at about 200 psi ethylene partial pressure are the following: 4 psi, 10 psi, 20 psi, 30 psi, and 40 psi.

EXAMPLES

The following examples are put forth so as to provide those skilled in the art with a complete disclosure and description of how to make and use the methods and systems of the invention, and are not intended to limit the scope of that which the inventors regard as their invention.

Example A

Example simulations were conducted for a gas phase ethylene polymerization reaction to evaluate the replacement of nitrogen gas with isopentane gas as a carrier fluid for catalyst delivery. For each example, the polymerizations were conducting in one of the following modes of operation, as indicated in the tables below: Dry Mode Operation ("DMO"), Enhanced Dry Mode Operation ("EDMO"), and Induced Condensing Mode Operation ("ICMO"). For each example, the following polymerization conditions were held constant: 90,000 lb/hr polyethylene production rate, 1000 dg/min Melt Index (I2), 364 psia reactor pressure, and 0.25 hydrogen/ethylene gas mole ratio with an ethylene composition of 0.9995 ethylene mole fraction and 0.0005 ethane mole fraction. The recycle gas superficial velocity was 2.32 ft/sec for all cases, except for ICMO condensing operation, where it was 2.10 ft/sec.

The results for Examples 1-9 are summarized in Table 1.

catalyst carrier fluid. For Examples 2 and 3, the nitrogen was replaced with isopentane to evaluate its use as a catalyst carrier fluid. As seen in Table 1 above, using isopentane as the carrier fluid reduced the total monomer ratio while also taking the reactor vent from 159 lbs/hr for Example 1 to 0 lbs/hr for Examples 2 and 3.

Examples 4-6 were conducted at an ethylene partial pressure of 260 psia. Example 4 was conducted using DMO while Examples 5 and 6 were conducted using EDMO. Example 4 was a comparative example conducted with nitrogen as a catalyst carrier fluid while Examples 5 and 6 replaced the nitrogen with isopentane. It can be seen in Table 1 above, that using isopentane as the carrier fluid reduced the total monomer ratio while also taking the reactor vent from 1,291 lbs/hr for Example 4 to 889 lbs/hr and 1,009 lbs/hr for Examples 5 and 6, respectively. However, as compared to Examples 1-3, the reactor vent was increased due the higher ethylene partial pressures.

Examples 7-9 were conducted at an ethylene partial pressure of 160 psia. Example 7 was conducted using DMO while Examples 8 and 9 were conducted using EDMO. Example 7 was a comparative example conducted with nitrogen as a

TABLE 1

|  | 1 | 2 | 3 | 4 | 5 | 6 | 7 | 8 | 9 |
|---|---|---|---|---|---|---|---|---|---|
| Reactor Operation | DMO | EDMO | EDMO | DMO | EDMO | EDMO | DMO | EDMO | EDMO |
| $C_2H_4$ Partial Pressure | 210 | 210 | 210 | 260 | 260 | 260 | 160 | 160 | 160 |
| $N_2$ Cat. Carrier Fluid (lbs/hr) | 60 | 0 | 0 | 60 | 0 | 0 | 60 | 0 | 0 |
| $i$-$C_5H_{12}$ Cat. Carrier Fluid (lbs/hr) | 0 | 60 | 120 | 0 | 60 | 120 | 0 | 60 | 120 |
| Recycle Gas Comp (mole fraction) | | | | | | | | | |
| Ethylene | 0.577 | 0.577 | 0.577 | 0.714 | 0.714 | 0.714 | 0.440 | 0.440 | 0.440 |
| Hydrogen | 0.144 | 0.144 | 0.144 | 0.179 | 0.179 | 0.179 | 0.110 | 0.110 | 0.110 |
| Ethane | 0.049 | 0.053 | 0.053 | 0.020 | 0.024 | 0.023 | 0.061 | 0.053 | 0.053 |
| Nitrogen | 0.229 | 0.212 | 0.200 | 0.085 | 0.073 | 0.067 | 0.389 | 0.383 | 0.372 |
| Isopentane | 0.000 | 0.013 | 0.024 | 0.000 | 0.008 | 0.015 | 0.000 | 0.013 | 0.024 |
| $C_2H_4$ Feed (lbs/hr) | 90578 | 90528 | 90528 | 91678 | 91383 | 91475 | 90374 | 90417 | 90417 |
| Total Monomer Ratio | 1.0064 | 1.0059 | 1.0059 | 1.0186 | 1.0154 | 1.0164 | 1.0042 | 1.0046 | 1.0046 |
| Reactor Vent (lbs/hr) | 159 | 0 | 0 | 1291 | 889 | 1009 | 0 | 0 | 0 |
| $N_2$ for Pressure Control (lbs/hr) | 0 | 11 | 6 | 0 | 0 | 0 | 60 | 117 | 112 |
| Cooling Water Inlet T (° C.) | 22.8 | 26.0 | 28.5 | 27.3 | 29.4 | 30.8 | 16.6 | 19.3 | 22.0 |
| Reactor Inlet T (° C.) | 26.3 | 29.8 | 32.5 | 31.0 | 33.2 | 34.7 | 20.1 | 23.0 | 25.9 |
| Reactor Inlet Dew Point (° C.) | −39.0 | −5.2 | 7.9 | −33.8 | −11.0 | −0.4 | −46.2 | −7.0 | 6.7 |

Examples 1-3 were conducted at an ethylene partial pressure of 210 psia. Example 1 was conducted using Dry Mode Operation ("DMO") while Examples 2 and 3 were conducted using Enhanced Dry Mode Operation ("EDMO"). Example 1 was a comparative example conducted with nitrogen as a catalyst carrier fluid while Examples 8 and 9 replaced the nitrogen with isopentane. Because of the low ethylene partial pressure, no reactor vent was needed for either catalyst carrier fluid.

The results for Examples 10-14 are summarized in Table 2

TABLE 2

|  | 10 | 11 | 12 | 13 | 14 |
|---|---|---|---|---|---|
| Reactor Operation | EDMO | EDMO | EDMO | ICMO | ICMO |
|  |  |  |  | 5 wt % Condensing |  |
| $C_2H_4$ Partial Pressure | 210 | 210 | 220 | 210 | 210 |
| $N_2$ Cat. Carrier Fluid (lbs/hr) | 60 | 30 | 0 | 60 | 0 |
| $i$-$C_5H_{12}$ Cat. Carrier Fluid (lbs/hr) | 0 | 30 | 60 | 0 | 60 |

TABLE 2-continued

|  | 10 | 11 | 12 | 13 | 14 |
|---|---|---|---|---|---|
| Recycle Gas Comp (mole fraction) | | | | | |
| Ethylene | 0.577 | 0.577 | 0.604 | 0.577 | 0.577 |
| Hydrogen | 0.144 | 0.144 | 0.151 | 0.144 | 0.144 |
| Ethane | 0.041 | 0.047 | 0.050 | 0.029 | 0.040 |
| Nitrogen | 0.208 | 0.204 | 0.180 | 0.123 | 0.110 |
| Isopentane | 0.028 | 0.026 | 0.012 | 0.125 | 0.128 |
| $C_2H_4$ Feed (lbs/hr) | 90668 | 90593 | 90577 | 90930 | 90696 |
| Total Monomer Ratio | 1.0074 | 1.0066 | 1.0064 | 1.0103 | 1.0077 |
| Reactor Vent(lbs/hr) | 221 | 103 | 41 | 738 | 307 |
| $N_2$ for Pressure Control (lbs/hr) | 0 | 0 | 0 | 0 | 0 |
| Cooling Water Inlet T (° C.) | 28.5 | 28.5 | 27.0 | 42.8 | 43.6 |
| Reactor Inlet T (° C.) | 32.5 | 32.5 | 30.9 | 50.7 | 51.5 |
| Reactor Inlet Dew Point(° C.) | 11.2 | 10.0 | −5.4 | 55.5 | 56.3 |

Example 10 was conducted to demonstrate the total monomer ratio advantage of using an isopentane catalyst carrier for EDMO. More particularly, Example 10 employed a nitrogen catalyst carrier of 60 lbs/hr and no isopentane carrier in EDMO to demonstrate the advantage of Example 3 that employed an isopentane catalyst carrier of 120 lbs/hr at approximately the same reactor gas composition and production rate. The isopentane for Example 10 shown in Table 2 is added by normal isopentane feed to the reactor. It can be seen in Tables 1 and 2 above that the use of the nitrogen catalyst carrier in Example 10 resulted in a higher total monomer ratio while also increasing the reactor vent from 0 lbs/hr to 221 lbs/h, thus illustrating the advantages achieved by the replacement of nitrogen with isopentane in Example 3.

Example 11 was conducted to demonstrate the total monomer ratio advantage of using a mixture of isopentane and nitrogen as a catalyst carrier for EDMO as compared to Example 10 that employed a nitrogen catalyst carrier. More particularly, Example 11 employed about the same reactor gas composition and isopentane compositions as Example 10 but with 30 lbs/hr isopentane and 30 lbs/hr nitrogen as the catalyst carrier fluid. As seen in Table 2 above, the total monomer ratio and reactor vent where lower for Example 11 with the mixture of isopentane and nitrogen as the catalyst carrier as compared to Example 10 that employed a nitrogen catalyst carrier.

Example 12 was conducted to evaluate an increase in ethylene partial pressure as compared to Example 1 with the use of an isopentane catalyst carrier. In particular, Example 12 increased the ethylene partial pressure to 220 psia from 210 psia in Example 1, and changed the carrier fluid to 60 lbs/hr isopentane from 60 lbs/hr nitrogen in Example 1. It can be seen from the tables above that the corresponding reactor vent decreased from 159 lbs/hr to 41 lbs/hr at the same total monomer ratio.

Examples 13 and 14 were conducted using 5 weight % ICMO at an ethylene partial pressure of 210 psia. Example 13 was a comparative example conducted with nitrogen as a catalyst carrier fluid. For Example 14, the nitrogen was replaced with isopentane to evaluate its use as a catalyst carrier fluid in ICMO. As seen in Table 2 above, the total monomer ratio decreased from 1.0103 to 1.0077 with a corresponding decrease of 80 lbs/hr in the total isopentane feed and a 431 lbs/hr decrease in the reactor vent. It should be noted that the water inlet temperature was above 42° C., and the inlet gas temperature was above 50° C. for both ICMO examples, indicating a significant amount of cooling was available to increase the production rate.

The above examples were not optimized to demonstrate increased production rate capability of EDMO with isopentane present or for the 5% weight ICMO. However, potential improvements in production rate are apparent in higher Cooling Water Inlet Temperatures and the higher Reactor Inlet Temperatures for the EDMO and ICMO operation as compared to the DMO.

Example B

Isopentane nitrogen equilibrium flash calculations were performed at 365 psia total pressure to evaluate flashing of isopentane in nitrogen. The flash calculations were performed at 70° C., 80° C., 90° C., 100° C., and 110° C. at various nitrogen-to-isopentane weight feed ratios. For each example, the flow rates of isopentane and nitrogen were calculated to provide equivalent vapor molar flow of nitrogen. The flash calculations were based on equivalent molar flow rates as 30 lbs/hr of nitrogen. The flash calculations were performed at 365 psia to determine the amount of liquid isopentane remaining. The estimated boiling point of isopentane at this pressure is 172.1° C.

Figure 5:
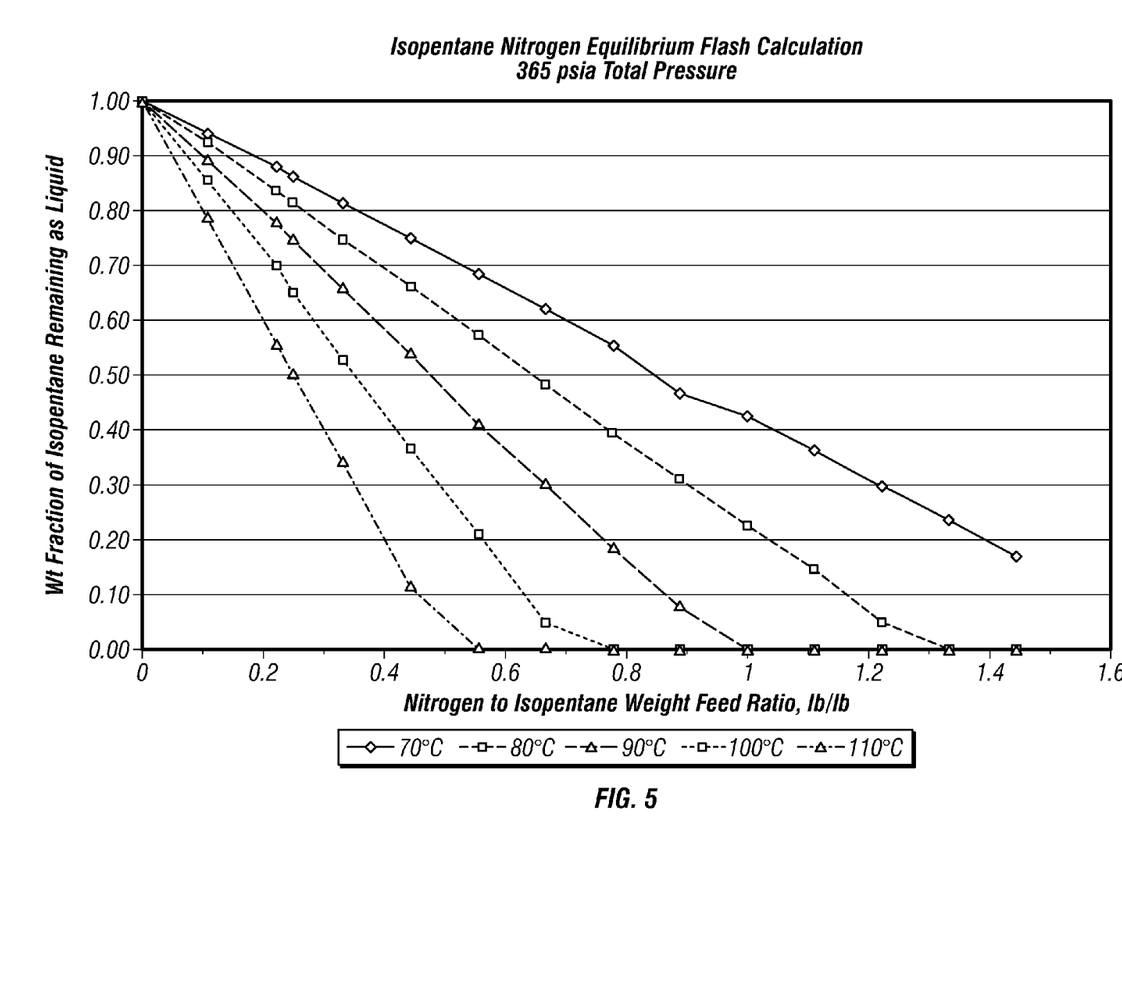
FIG. 5 is a plot showing exemplary results for isopentane/nitrogen equilibrium flash calculations at 365 psia total pressure.

The results for the flash calculations are summarized in the tables below. Table 3 shows the weight fraction of isopentane remaining as a liquid. Table 4 shows the nitrogen, gaseous isopentane, and liquid isopentane flow rates. FIG. 5 is a graph showing the nitrogen to isopentane weight feed ratio versus the weight fraction of isopentane remaining as liquid.

TABLE 3

| N2/IC5 | Weight Fraction Isopentane Remaining as Liquid at 365 psia Total Pressure Temperature | | | | |
|---|---|---|---|---|---|
| mass ratio | 70° C. | 80° C. | 90° C. | 100° C. | 110° |
| 0 | 1.000 | 1.000 | 1.000 | 1.000 | 1.000 |
| 0.111 | | 0.9250 | | | |
| 0.222 | 0.8800 | 0.8370 | 0.7780 | 0.6950 | 0.5580 |
| 0.250 | 0.8630 | 0.8150 | 0.7480 | 0.6540 | 0.5030 |
| 0.333 | 0.8150 | 0.7490 | 0.6580 | 0.5290 | 0.3430 |
| 0.444 | 0.7500 | 0.6620 | 0.5380 | 0.3650 | 0.1130 |
| 0.556 | 0.6840 | 0.5720 | 0.4120 | 0.2090 | 0.0000 |
| 0.667 | 0.6200 | 0.4840 | 0.3020 | 0.0500 | 0.0000 |
| 0.778 | 0.5540 | 0.3960 | 0.1850 | 0.0000 | 0.0000 |
| 0.889 | 0.4670 | 0.3120 | 0.0780 | 0.0000 | 0.0000 |
| 1.000 | 0.4260 | 0.2250 | 0.0000 | 0.0000 | 0.0000 |
| 1.111 | 0.3640 | 0.1450 | 0.0000 | 0.0000 | 0.0000 |
| 1.222 | 0.2970 | 0.0490 | 0.0000 | 0.0000 | 0.0000 |
| 1.333 | 0.2350 | 0.0000 | 0.0000 | 0.0000 | 0.0000 |
| 1.444 | 0.1690 | 0.0000 | 0.0000 | 0.0000 | 0.0000 |

TABLE 4

| N2/IC5 mass ratio | N2, lbs/hr | Vapor IC5, lbs/hr | Liquid IC5, lbs/hr | N2, lbs/hr | Vapor IC5, lbs/hr | Liquid IC5, lbs/hr | N2, lbs/hr | Vapor IC5, lbs/hr | Liquid IC5, lbs/hr | N2, lbs/hr | Vapor IC5, lbs/hr | Liquid IC5, lbs/hr | N2, lbs/hr | Vapor IC5, lbs/hr | Liquid IC5, lbs/hr |
|---|---|---|---|---|---|---|---|---|---|---|---|---|---|---|---|
| | | 70° C. | | | 80° C. | | | 90° C. | | | 100° C. | | | 110° C. | |
| 0 | — | 0.00 | — | — | 0.00 | — | — | 0.00 | — | — | 0.00 | — | — | 0.00 | — |
| 0.111 | | | | 23.77 | 16.06 | 198.06 | | | | | | | | | |
| 0.222 | 24.80 | 13.40 | 98.30 | 23.35 | 17.14 | 88.03 | 21.61 | 21.61 | 75.74 | 19.57 | 26.88 | 61.26 | 16.92 | 33.69 | 42.54 |
| 0.25 | 24.74 | 13.56 | 85.40 | 23.31 | 17.25 | 75.98 | 21.56 | 21.74 | 64.52 | 19.52 | 27.01 | 51.06 | 16.93 | 33.67 | 34.07 |
| 0.333 | 24.68 | 13.71 | 60.40 | 23.21 | 17.50 | 52.21 | 21.45 | 22.03 | 42.39 | 19.37 | 27.40 | 30.77 | 16.99 | 33.52 | 17.50 |
| 0.444 | 24.62 | 13.86 | 41.59 | 23.16 | 17.63 | 34.53 | 21.37 | 22.24 | 25.89 | 19.29 | 27.59 | 15.86 | 16.90 | 33.76 | 4.30 |
| 0.556 | 24.58 | 13.97 | 30.24 | 23.10 | 17.78 | 23.76 | 21.27 | 22.49 | 15.76 | 19.33 | 27.50 | 7.27 | 17.67 | 31.78 | 0.00 |
| 0.667 | 24.57 | 14.00 | 22.85 | 23.07 | 17.86 | 16.75 | 21.33 | 22.33 | 9.66 | 19.32 | 27.53 | 1.45 | 18.96 | 28.44 | 0.00 |
| 0.778 | 24.54 | 14.07 | 17.48 | 23.05 | 17.90 | 11.74 | 21.33 | 22.35 | 5.07 | 20.01 | 25.73 | 0.00 | 20.01 | 25.73 | 0.00 |
| 0.889 | 24.34 | 14.59 | 12.79 | 23.07 | 17.86 | 8.10 | 21.39 | 22.19 | 1.88 | 20.88 | 23.49 | 0.00 | 20.88 | 23.49 | 0.00 |
| 1.000 | 24.53 | 14.08 | 10.45 | 23.06 | 17.87 | 5.19 | 21.61 | 21.61 | 0.00 | 21.61 | 21.61 | 0.00 | 21.61 | 21.61 | 0.00 |
| 1.111 | 24.55 | 14.05 | 8.04 | 23.10 | 17.78 | 3.01 | 22.23 | 20.01 | 0.00 | 22.23 | 20.01 | 0.00 | 22.23 | 20.01 | 0.00 |
| 1.222 | 24.53 | 14.11 | 5.96 | 23.04 | 17.93 | 0.92 | 22.77 | 18.63 | 0.00 | 22.77 | 18.63 | 0.00 | 22.77 | 18.63 | 0.00 |
| 1.333 | 24.54 | 14.08 | 4.32 | 23.24 | 17.43 | 0.00 | 23.24 | 17.43 | 0.00 | 23.24 | 17.43 | 0.00 | 23.24 | 17.43 | 0.00 |
| 1.444 | 24.52 | 14.11 | 2.87 | 23.65 | 16.37 | 0.00 | 23.65 | 16.37 | 0.00 | 23.65 | 16.37 | 0.00 | 23.65 | 16.37 | 0.00 |

Example C

The isopentane nitrogen equilibrium flash calculations were repeated at 300 psia to evaluate flashing of isopentane in nitrogen at this lower pressure. The flash calculations were performed at 70° C., 80° C., 90° C., 100° C., and 110° C. at various nitrogen-to-isopentane weight feed ratios. For each example, the flow rates of isopentane and nitrogen were calculated to provide equivalent vapor molar flow of nitrogen. The flash calculations were based on equivalent molar flow rates as 30 lbs/hr of nitrogen. The flash calculations were performed at 300 psia to determine the amount of liquid isopentane remaining. The estimated boiling point of isopentane at this pressure is 157.2° C.

Figure 6:
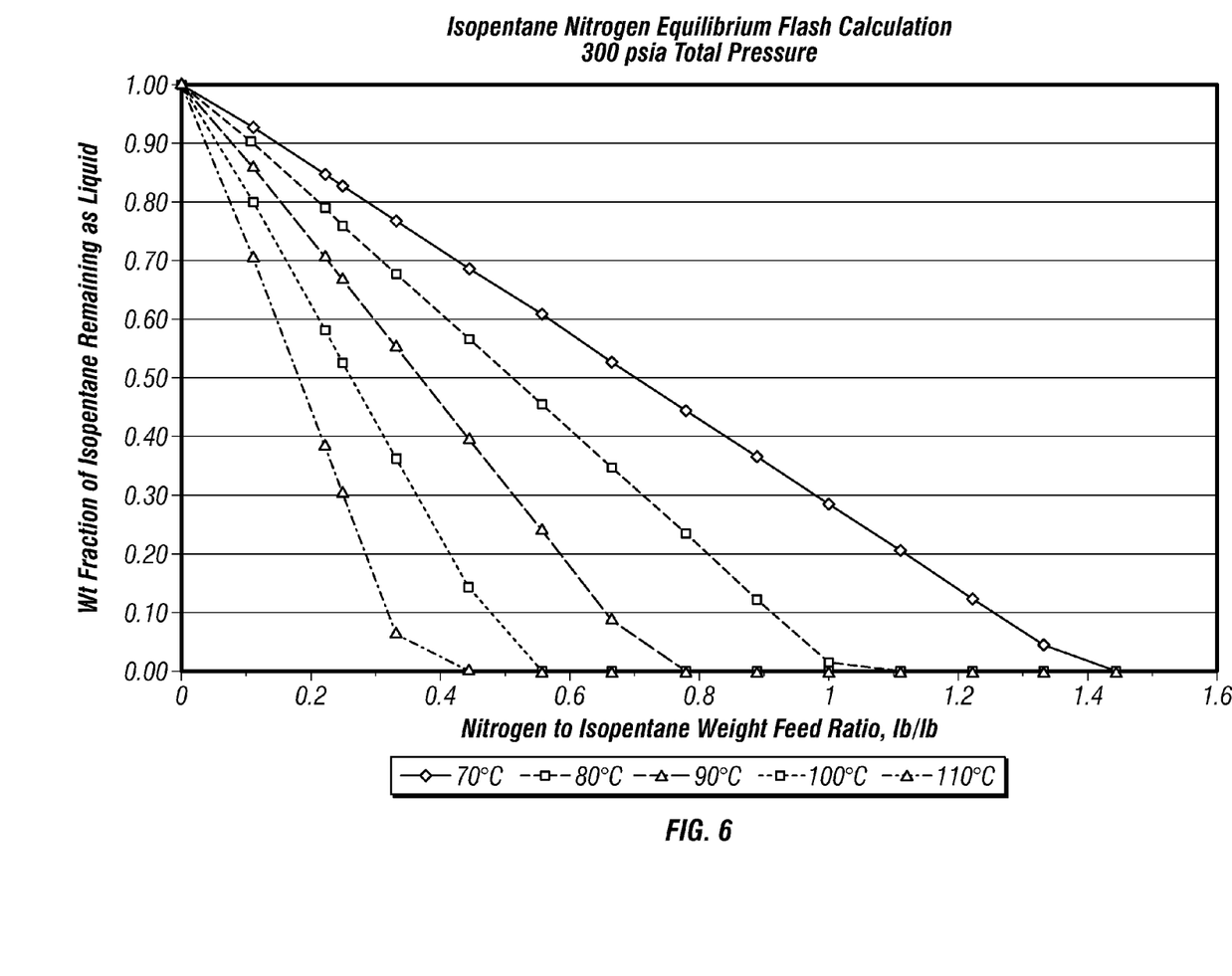
FIG. 6 is a plot showing exemplary results for isopentane/nitrogen equilibrium flash calculations at 300 psia total pressure.

The results for the flash calculations are summarized in the tables below. Table 5 shows the weight fraction of isopentane remaining as a liquid. Table 6 shows the nitrogen, gaseous isopentane, and liquid isopentane flow rates. FIG. 6 is a graph showing the nitrogen to isopentane weight feed ratio versus the weight fraction of isopentane remaining as liquid.

TABLE 5

Weight Fraction Isopentane Remaining as Liquid at 300 psia Total Pressure

| N2/IC5 mass ratio | 70° C. | 80° C. | 90° C. | 100° C. | 110° |
|---|---|---|---|---|---|
| 0 | 1.000 | 1.000 | 1.000 | 1.000 | 1.000 |
| 0.111 | 0.9290 | 0.9014 | 0.8617 | 0.8023 | 0.7084 |
| 0.222 | 0.8487 | 0.7904 | 0.7069 | 0.5827 | 0.3875 |
| 0.25 | 0.8286 | 0.7627 | 0.6682 | 0.5277 | 0.3073 |
| 0.333 | 0.7684 | 0.6795 | 0.5521 | 0.3630 | 0.0666 |
| 0.444 | 0.6881 | 0.5685 | 0.3973 | 0.1433 | 0.0000 |
| 0.556 | 0.6079 | 0.4575 | 0.2426 | 0.0000 | 0.0000 |
| 0.667 | 0.5276 | 0.3465 | 0.0878 | 0.0000 | 0.0000 |
| 0.778 | 0.4473 | 0.2356 | 0.0000 | 0.0000 | 0.0000 |
| 0.889 | 0.3670 | 0.1246 | 0.0000 | 0.0000 | 0.0000 |
| 1.000 | 0.2868 | 0.0136 | 0.0000 | 0.0000 | 0.0000 |
| 1.111 | 0.2065 | 0.0000 | 0.0000 | 0.0000 | 0.0000 |
| 1.222 | 0.1262 | 0.0000 | 0.0000 | 0.0000 | 0.0000 |
| 1.333 | 0.0460 | 0.0000 | 0.0000 | 0.0000 | 0.0000 |
| 1.444 | 0.0000 | 0.0000 | 0.0000 | 0.0000 | 0.0000 |

TABLE 6

| N2/IC5 mass ratio | N2, lbs/hr | Vapor IC5, lbs/hr | Liquid IC5, lbs/hr | N2, lbs/hr | Vapor IC5, lbs/hr | Liquid IC5, lbs/hr | N2, lbs/hr | Vapor IC5, lbs/hr | Liquid IC5, lbs/hr | N2, lbs/hr | Vapor IC5, lbs/hr | Liquid IC5, lbs/hr | N2, lbs/hr | Vapor IC5, lbs/hr | Liquid IC5, lbs/hr |
|---|---|---|---|---|---|---|---|---|---|---|---|---|---|---|---|
| | | 70° C. | | | 80° C. | | | 90° C. | | | 100° C. | | | 110° C. | |
| 0 | — | 0.00 | — | — | 0.00 | — | — | 0.00 | — | — | 0.00 | — | — | 0.00 | — |
| 0.111 | 24.03 | 15.38 | 201.11 | 22.31 | 19.82 | 181.17 | 20.22 | 25.19 | 157.00 | 17.74 | 31.59 | 128.23 | 14.86 | 39.02 | 94.81 |
| 0.222 | 23.72 | 16.17 | 90.70 | 21.96 | 20.73 | 78.17 | 19.84 | 26.19 | 63.17 | 17.35 | 32.61 | 45.52 | 14.49 | 39.97 | 25.29 |
| 0.250 | 23.70 | 16.24 | 78.54 | 21.92 | 20.81 | 66.88 | 19.80 | 26.28 | 52.93 | 17.31 | 32.70 | 36.54 | 14.46 | 40.06 | 17.77 |
| 0.333 | 23.62 | 16.43 | 54.51 | 21.84 | 21.02 | 44.56 | 19.71 | 26.51 | 32.68 | 17.22 | 32.94 | 18.77 | 14.37 | 40.28 | 2.87 |
| 0.444 | 23.57 | 16.56 | 36.54 | 21.78 | 21.17 | 27.89 | 19.65 | 26.67 | 17.58 | 17.15 | 33.10 | 5.54 | 16.01 | 36.05 | 0.00 |
| 0.556 | 23.55 | 16.61 | 25.75 | 21.76 | 21.23 | 17.91 | 19.62 | 26.73 | 8.56 | 17.67 | 31.78 | 0.00 | 17.67 | 31.78 | 0.00 |
| 0.667 | 23.53 | 16.67 | 18.62 | 21.73 | 21.30 | 11.30 | 19.59 | 26.81 | 2.58 | 18.96 | 28.44 | 0.00 | 18.96 | 28.44 | 0.00 |
| 0.778 | 23.52 | 16.71 | 13.52 | 21.72 | 21.34 | 6.58 | 20.01 | 25.73 | 0.00 | 20.01 | 25.73 | 0.00 | 20.01 | 25.73 | 0.00 |
| 0.889 | 23.50 | 16.74 | 9.71 | 21.70 | 21.38 | 3.04 | 20.88 | 23.49 | 0.00 | 20.88 | 23.49 | 0.00 | 20.88 | 23.49 | 0.00 |
| 1.000 | 23.50 | 16.76 | 6.74 | 21.70 | 21.40 | 0.30 | 21.61 | 21.61 | 0.00 | 21.61 | 21.61 | 0.00 | 21.61 | 21.61 | 0.00 |
| 1.111 | 23.49 | 16.78 | 4.37 | 22.23 | 20.01 | 0.00 | 22.23 | 20.01 | 0.00 | 22.23 | 20.01 | 0.00 | 22.23 | 20.01 | 0.00 |
| 1.222 | 23.48 | 16.79 | 2.43 | 22.77 | 18.63 | 0.00 | 22.77 | 18.63 | 0.00 | 22.77 | 18.63 | 0.00 | 22.77 | 18.63 | 0.00 |
| 1.333 | 23.48 | 16.80 | 0.81 | 23.24 | 17.43 | 0.00 | 23.24 | 17.43 | 0.00 | 23.24 | 17.43 | 0.00 | 23.24 | 17.43 | 0.00 |
| 1.444 | 23.65 | 16.37 | 0.00 | 23.65 | 16.37 | 0.00 | 23.65 | 16.37 | 0.00 | 23.65 | 16.37 | 0.00 | 23.65 | 16.37 | 0.00 |

Example D

N-butane nitrogen equilibrium flash calculations were performed at 365 psia total pressure to evaluate flashing of n-butane in nitrogen. The flash calculations were performed at 70° C., 80° C., 90° C., 100° C., and 110° C. at various nitrogen-to-n-butane weight feed ratios. For each example, the flow rates of n-butane and nitrogen were calculated to provide equivalent vapor molar flow of nitrogen. The flash calculations were based on equivalent molar flow rates as 30 lbs/hr of nitrogen. The flash calculations were performed at 365 psia to determine the amount of liquid n-butane remaining. The estimated boiling point of n-butane at this pressure is 129.4° C.

Figure 7:
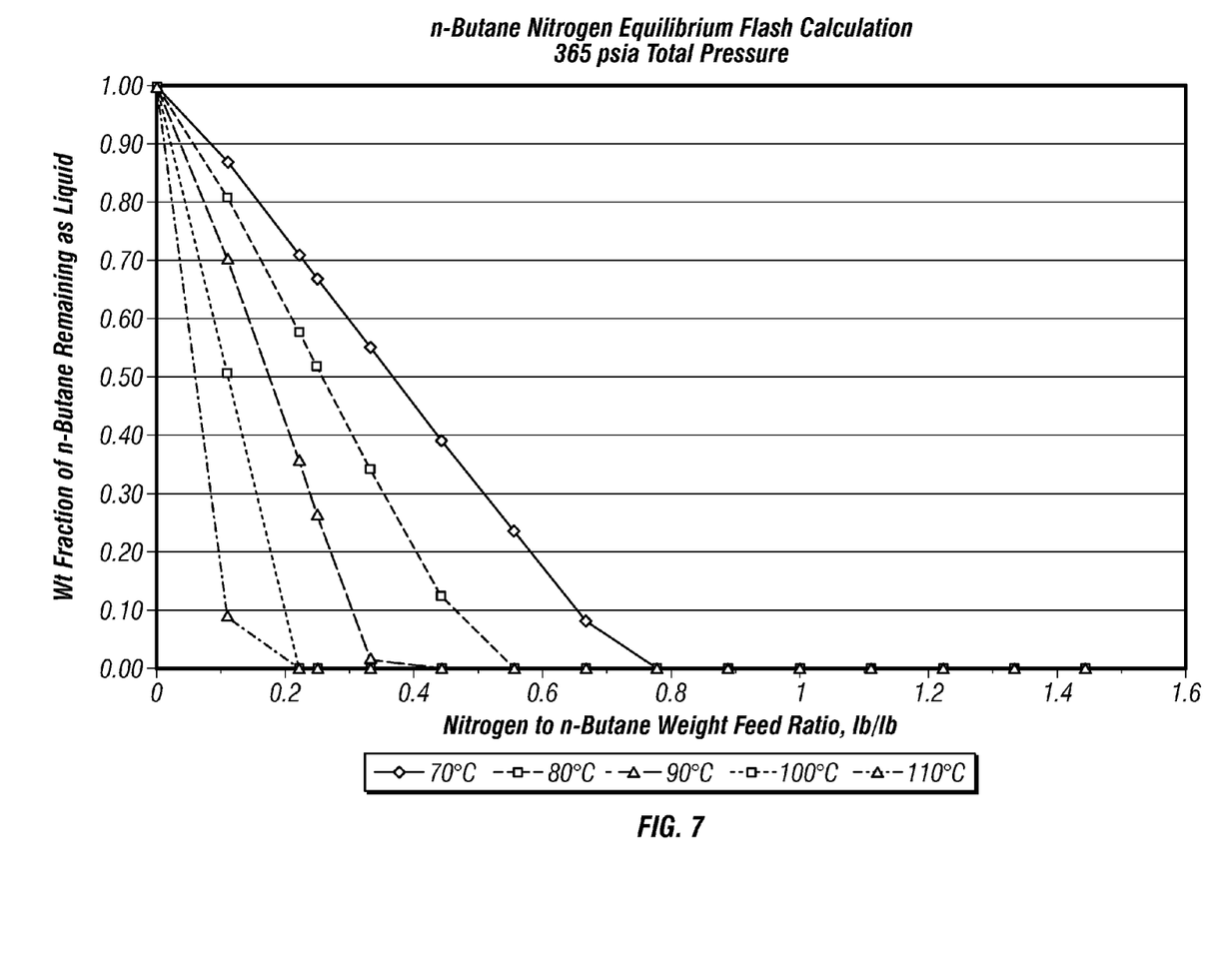
FIG. 7 is a plot showing exemplary results for n-butane/nitrogen equilibrium flash calculations at 365 psia total pressure.

The results for the flash calculations are summarized in the tables below. Table 7 shows the weight fraction of n-butane remaining as a liquid. Table 8 shows the nitrogen, gaseous n-butane, and liquid n-butane flow rates. FIG. 7 is a graph showing the nitrogen to n-butane weight feed ratio versus the weight fraction of n-butane remaining as liquid.

TABLE 7

| N2/n-C4 mass ratio | Weight Fraction n-Butane Remaining as Liquid at 365 psia Total Pressure Temperature | | | | |
|---|---|---|---|---|---|
| | 70° C. | 80° C. | 90° C. | 100° C. | 110° C. |
| 0 | 1.000 | 1.000 | 1.000 | 1.000 | 1.000 |
| 0.111 | 0.8690 | 0.8070 | 0.7040 | 0.5080 | 0.0910 |
| 0.222 | 0.7090 | 0.5770 | 0.3580 | 0.0000 | 0.0000 |
| 0.250 | 0.6680 | 0.5170 | 0.2660 | 0.0000 | 0.0000 |
| 0.333 | 0.5500 | 0.3420 | 0.0170 | 0.0000 | 0.0000 |
| 0.444 | 0.3900 | 0.1250 | 0.0000 | 0.0000 | 0.0000 |
| 0.556 | 0.2360 | 0.0000 | 0.0000 | 0.0000 | 0.0000 |
| 0.667 | 0.0810 | 0.0000 | 0.0000 | 0.0000 | 0.0000 |
| 0.778 | 0.0000 | 0.0000 | 0.0000 | 0.0000 | 0.0000 |
| 0.889 | 0.0000 | 0.0000 | 0.0000 | 0.0000 | 0.0000 |
| 1.000 | 0.0000 | 0.0000 | 0.0000 | 0.0000 | 0.0000 |
| 1.111 | 0.0000 | 0.0000 | 0.0000 | 0.0000 | 0.0000 |
| 1.222 | 0.0000 | 0.0000 | 0.0000 | 0.0000 | 0.0000 |
| 1.333 | 0.0000 | 0.0000 | 0.0000 | 0.0000 | 0.0000 |
| 1.444 | 0.0000 | 0.0000 | 0.0000 | 0.0000 | 0.0000 |

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A method for the delivery of a catalyst to a polymerization reactor, comprising:

heating a fluid comprising an inert liquid hydrocarbon in a heat exchanger to vaporize at least a portion of the inert liquid hydrocarbon and form an inert hydrocarbon in gaseous form;

TABLE 8

| N2/n-C4 mass ratio | N2, lbs/hr | Vapor n-C4, lbs/hr | Liquid n-C4, lbs/hr | N2, lbs/hr | Vapor n-C4, lbs/hr | Liquid n-C4, lbs/hr | N2, lbs/hr | Vapor n-C4, lbs/hr | Liquid n-C4, lbs/hr | N2, lbs/hr | Vapor n-C4, lbs/hr | Liquid n-C4, lbs/hr | N2, lbs/hr | Vapor n-C4, lbs/hr | Liquid n-C4, lbs/hr |
|---|---|---|---|---|---|---|---|---|---|---|---|---|---|---|---|
| | 70° C. | | | 80° C. | | | 90° C. | | | 100° C. | | | 110° C. | | |
| 0 | | 0.00 | | | 0.00 | | | 0.00 | | | 0.00 | | | 0.00 | |
| 0.111 | 19.13 | 22.57 | 149.73 | 16.33 | 28.39 | 118.69 | 13.13 | 35.02 | 83.28 | 9.57 | 42.41 | 43.79 | 6.07 | 49.68 | 4.97 |
| 0.222 | 18.39 | 24.10 | 58.73 | 15.64 | 29.80 | 40.65 | 12.54 | 36.25 | 20.21 | 9.46 | 42.63 | 0.00 | 9.46 | 42.63 | 0.00 |
| 0.25 | 18.30 | 24.30 | 48.88 | 15.54 | 30.02 | 32.13 | 12.43 | 36.48 | 13.22 | 10.25 | 41.00 | 0.00 | 10.25 | 41.00 | 0.00 |
| 0.333 | 18.17 | 24.55 | 30.01 | 15.37 | 30.37 | 15.78 | 12.39 | 36.56 | 0.63 | 12.26 | 36.82 | 0.00 | 12.26 | 36.82 | 0.00 |
| 0.444 | 18.05 | 24.80 | 15.86 | 15.39 | 30.33 | 4.33 | 14.39 | 32.41 | 0.00 | 14.39 | 32.41 | 0.00 | 14.39 | 32.41 | 0.00 |
| 0.556 | 18.05 | 24.80 | 7.66 | 16.07 | 28.91 | 0.00 | 16.07 | 28.91 | 0.00 | 16.07 | 28.91 | 0.00 | 16.07 | 28.91 | 0.00 |
| 0.667 | 18.03 | 24.85 | 2.19 | 17.42 | 26.12 | 0.00 | 17.42 | 26.12 | 0.00 | 17.42 | 26.12 | 0.00 | 17.42 | 26.12 | 0.00 |
| 0.778 | 18.53 | 23.82 | 0.00 | 18.53 | 23.82 | 0.00 | 18.53 | 23.82 | 0.00 | 18.53 | 23.82 | 0.00 | 18.53 | 23.82 | 0.00 |
| 0.889 | 19.46 | 21.89 | 0.00 | 19.46 | 21.89 | 0.00 | 19.46 | 21.89 | 0.00 | 19.46 | 21.89 | 0.00 | 19.46 | 21.89 | 0.00 |
| 1.000 | 20.25 | 20.25 | 0.00 | 20.25 | 20.25 | 0.00 | 20.25 | 20.25 | 0.00 | 20.25 | 20.25 | 0.00 | 20.25 | 20.25 | 0.00 |
| 1.111 | 20.93 | 18.83 | 0.00 | 20.93 | 18.83 | 0.00 | 20.93 | 18.83 | 0.00 | 20.93 | 18.83 | 0.00 | 20.93 | 18.83 | 0.00 |
| 1.222 | 21.52 | 17.61 | 0.00 | 21.52 | 17.61 | 0.00 | 21.52 | 17.61 | 0.00 | 21.52 | 17.61 | 0.00 | 21.52 | 17.61 | 0.00 |
| 1.333 | 22.04 | 16.53 | 0.00 | 22.04 | 16.53 | 0.00 | 22.04 | 16.53 | 0.00 | 22.04 | 16.53 | 0.00 | 22.04 | 16.53 | 0.00 |
| 1.444 | 22.50 | 15.57 | 0.00 | 22.50 | 15.57 | 0.00 | 22.50 | 15.57 | 0.00 | 22.50 | 15.57 | 0.00 | 22.50 | 15.57 | 0.00 | contacting a catalyst with a carrier fluid comprising the inert hydrocarbon, the inert hydrocarbon having a normal boiling point of about −1° C. to about 81° C.; and flowing the carrier fluid to the polymerization reactor such that the carrier fluid transports the catalyst to the polymerization reactor, wherein the inert hydrocarbon is present in the carrier fluid in a gaseous form or a combination of liquid and gaseous form.

2. The method of claim 1, wherein the inert hydrocarbon comprises n-butane.

3. The method of claim 1, wherein the inert hydrocarbon comprises isopentane.

4. The method of claim 1, wherein the inert hydrocarbon comprises a saturated C5 or a saturated C6 hydrocarbon.

5. The method of claim 1, wherein the carrier fluid further comprises nitrogen.

6. The method of claim 1, wherein the inert hydrocarbon in gaseous form at least partially condenses as the carrier fluid flows to the polymerization reactor.

7. The method of 1, wherein at least about 90% of the liquid hydrocarbon is vaporized by the heat exchanger.

8. The method of claim 1, further comprising flashing a fluid comprising an inert liquid hydrocarbon across a valve to form the inert hydrocarbon in gaseous form present in the carrier fluid.

9. The method of claim 8, comprising heating the fluid comprising the liquid hydrocarbon in a heat exchanger prior to flashing the fluid across the valve.

10. The method of claim 1, further comprising heating a catalyst injection line, wherein the carrier fluid flows to the reactor in the catalyst injection line.

11. A polymerization process comprising: polymerizing an olefin in the polymerization reactor in the presence of the catalyst, wherein the catalyst is introduced into the polymerization reactor in accordance with claim 1.

12. The polymerization process of claim 11, wherein the process is a gas phase process and the reactor is a fluidized bed reactor.

13. The polymerization process of claim 11, wherein the catalyst is introduced into the reactor continuously.

14. A catalyst delivery system, comprising:

a catalyst vessel for containing a catalyst;

a catalyst injection line for delivering the catalyst to a polymerization reactor, the catalyst injection line being in fluid communication with the catalyst vessel and the polymerization reactor;

a carrier fluid line in fluid communication with the catalyst injection line for delivering a carrier fluid comprising an inert hydrocarbon in gaseous form to the catalyst injection line, the inert hydrocarbon having a normal boiling point of about −1° C. to about 81° C.;

a hydrocarbon feed line in fluid communication with the carrier fluid line;

and a heat exchanger coupled to the hydrocarbon feed line for heating an inert hydrocarbon in the hydrocarbon feed line.

15. The catalyst delivery system of claim 14, further comprising a valve coupled to the hydrocarbon feed line for flashing liquid inert hydrocarbon in the hydrocarbon feed line.

\* \* \* \* \*